(12) United States Patent
Liaw et al.

(10) Patent No.: US 7,616,667 B2
(45) Date of Patent: Nov. 10, 2009

(54) BROADBAND FIBER LASER

(75) Inventors: Shien-Kuei Liaw, Yangmei Township, Taoyuan County (TW); Guo-Sing Jhong, Wugu Township, Taipei County (TW); Jian-An Chen, Wandan Township, Pingtung County (TW)

(73) Assignee: National Taiwan University of Science and Technology, Taipei (TW)

( * ) Notice: Subject to any disclaimer, the term of this patent is extended or adjusted under 35 U.S.C. 154(b) by 65 days.

(21) Appl. No.: 11/976,338

(22) Filed: Oct. 24, 2007

(65) Prior Publication Data

US 2008/0267226 A1    Oct. 30, 2008

(30) Foreign Application Priority Data

Apr. 27, 2007  (TW) .............................. 96115197 A

(51) Int. Cl.
*H01S 3/30*  (2006.01)

(52) U.S. Cl. ............................ 372/6; 372/50.11; 372/69
(58) Field of Classification Search ..................... 372/6, 372/50.11
See application file for complete search history.

(56) References Cited

U.S. PATENT DOCUMENTS

| 7,130,319 B1* | 10/2006 | Kaneda et al. ................. 372/10 |
| 2005/0201427 A1* | 9/2005 | Luo et al. ..................... 372/23 |
| 2008/0192780 A1* | 8/2008 | Luo et al. ..................... 372/14 |

* cited by examiner

*Primary Examiner*—Dung T Nguyen
(74) *Attorney, Agent, or Firm*—Rosenberg, Klein & Lee

(57) ABSTRACT

A broadband fiber laser provides a lasing cavity including a reflective mirror and at least one fiber Bragg grating for further providing a lasing signal to resonate and be amplified therein. Alternatively, the wavelength of the fiber laser can be either fixed or tunable by varying the central wavelength of the fiber Bragg grating and/or by adjusting the switching status of an optical switch pair.

10 Claims, 10 Drawing Sheets

BROADBAND FIBER LASER

BACKGROUND OF THE INVENTION

1. Field of the Invention

This present invention relates to a laser, and more particularly to a broadband fiber laser.

2. Description of the Prior Art

In the prior art, an Erbium doped fiber laser includes a lasing cavity consisting of two reflective mirrors, and a gain medium consisting of a pumping source and an Erbium doped fiber. Hence, the light wave can resonate in the resonance cavity and will be amplified by the gain medium.

In FIG. 1, a structural diagram of the fiber laser of the prior art is shown. The fiber laser 100 is an Erbium doped fiber laser including a resonance cavity with a fiber Bragg grating (FBG) pair. The fiber laser 100 includes a pumping source 110, an optical isolator 120, a WDM coupler 130, an Erbium doped fiber 140, a fiber Bragg grating 150, a FBG 160, an application device 180, and a spectrum detection device 170. The central wavelength of the FBG 150 is identical to that of the FBG 160.

In the fiber laser 100, the pumping source 110 pumps the Erbium doped fiber 140 to spontaneously emit radiation (a light signal) within a broadband spectrum. Next, the wavelength equal to the central wavelength of the FBGs may resonate and is amplified in the gain medium between the FBGs. The fiber laser 100 outputs the passed light from the FBG 150 as a laser light.

In FIG. 2, a spectrum of the output of the fiber laser of the prior art is shown. In the spectrum of the laser light shown on the spectrum detection device 170, the wavelength is 1550.4 nm. The power is 6.0 dBm, the side mode suppression ratio (SMSR) is 56.3 dB, and the 3 dB line-width is less than 0.05 nm, limited by the optical spectrum analyzer. Wherein, the light power of the pumping source 110 is 100 mW, the length of the Erbium doped fiber 140 is 5 m, the central wavelength of the FBGs 150 and 160 is 1550.4 nm. Moreover, the reflectivity of the FBG 150 is 70%, and the reflectivity of the FBG 160 is greater than 99%.

However, the FBG 150 has to be identical to the FBG 160. Based on the condition of the FBGs, the output power of the fiber laser 100 will reduce if the central wavelength of the FBGs shifts and/or misalignment. Moreover, users have to adjust the central wavelength of the FBGs simultaneously if the FBGs are tunable, and users have to maintain the misalignment between the FBGs as less than 0.1 nm.

In FIG. 3, an Erbium doped fiber laser including a resonance cavity with an optical circulator is shown. The fiber laser 200 includes a pumping source 210, an optical isolator 220, a WDM coupler 230, an Erbium doped fiber 240, an optical circulator 250, a FBG 260, an application device 280, and a spectrum detection device 270.

The light signal can resonate between the optical circulator 250 and the FBG 260 and be amplified by the Erbium doped fiber 240, wherein the optical circulator 250 is associated with the FBG 260 to generate a linear resonance cavity.

Based on the third port of the optical circulator 250 connecting to its first port, after the second port of the optical circulator 250 receives the light signal, the light signal is coupled into the third port and the first port in turn. Next, the light signal is transmitted from the second port of the optical circulator 250 to the Erbium doped fiber 240 to be amplified again. Thus, the energy of the amplified light signal is greater than the energy of the light power provided by the pumping source 210. Finally, the fiber laser 200 outputs the passed light from the FBG 260 as a laser light.

In the case of the fiber laser 200, based on the twice light signal amplified, the light power is used and transformed effectively.

In FIG. 4, the output spectrum of the prior fiber laser is shown. In the spectrum of the laser light shown on the spectrum detection device 270, the wavelength is 1543.0 nm, the power is 12.3 dBm, the SMSR is 58.2 dB, and the 3 dB line-width is less than 0.05 nm. Wherein, the light power of the 1480 nm-pumping source 210 is 100 mW and the length of the Erbium doped fiber 240 is 3 m. Moreover, the reflectivity of the FBG 260 is 50%.

However, the optical circulator 250 wastes lots of energy of the light signal when coupling the light signal from one port to the next port. Hence, this disadvantage further influences the output presentation of the fiber laser 200.

In addition, the output power of the laser light decreases if the reflectivity of the FBG gets higher, the resonated power will be too low in the resonance cavity if the reflectivity of the FBG is low. Hence, this disadvantage means that the fiber laser cannot increase the power of the light signal and the laser light efficiently.

SUMMARY OF THE INVENTION

It is an object of the present invention that the fiber laser provides a resonance cavity so that the light signal can resonate and be amplified in the resonance cavity.

It is another object of the present invention that the fiber laser can ignore the shifted wavelength of the fiber Bragg grating, and the consistency of the fiber Bragg gratings.

It is another object of the present invention that the fiber laser can select the wavelength of its output.

It is another object of the present invention that the band of the output of the fiber laser can become greater.

In order to achieve the above objects, the present invention provides a first embodiment of a fiber laser that comprises a pumping source, an optical isolator, a WDM coupler, an Erbium doped fiber, a fiber Bragg grating, and a reflective mirror.

In the first embodiment of the present invention, the light power provided by the pumping source is coupled into the transmission path of the fiber laser via the WDM coupler. The light power pumps the Erbium doped fiber to generate a spontaneous emission. The light signal is projected onto the fiber Bragg grating, and then the narrow line-band conforming to the central wavelength is reflected by the fiber Bragg grating. Next, the reflected narrow line-band is projected onto the reflective mirror and then is reflected back to the fiber Bragg grating again. Hence, the fiber laser can output the laser light with the narrow line-band conforming to the central wavelength.

In the second embodiment of the present invention, the fiber laser comprises a pumping source, an optical isolator, a WDM coupler, an Erbium doped fiber, a fiber Bragg grating, and a reflective mirror.

In the second embodiment, the light power provided by the pumping source is coupled to the transmission path of the fiber laser via the WDM coupler. The light power pumps the Erbium doped fiber to generate a light signal. The light signal is projected onto the reflective mirror and then is reflected to the fiber Bragg grating. Next, the reflected light signal is projected onto the fiber Bragg grating and then the narrow line-band conforming to the central wavelength of the fiber Bragg grating is reflected back to the reflective mirror again. Hence, the fiber laser can output the laser light with a narrow line-band conforming to the central wavelength.

In the third embodiment of the present invention, the fiber laser comprises a switch pair, a plurality of fiber Bragg gratings, a pumping source, an optical isolator, a WDM coupler, an Erbium doped fiber, and a reflective mirror, wherein the original central wavelength of each fiber Bragg grating is different from the other.

In the third embodiment, the light power provided by the pumping source is coupled into the transmission path of the fiber laser via the WDM coupler. The light power pumps the Erbium doped fiber to generate a light signal. The light signal is projected onto the fiber Bragg grating installed on one of the switching paths by the user's definition, and then the narrow line-band conforming to the central wavelength of the selected fiber Bragg grating is reflected by the selected fiber Bragg grating. Next, the reflected narrow line-band is projected onto the reflective mirror and is then reflected back to the selected fiber Bragg grating again. Hence, the fiber laser can output the laser light with a narrow line-band conforming to the central wavelength.

Moreover, the fiber Bragg grating in the first, second, or third embodiment can be tunable or untunable. The present invention can increase the bandwidth of the laser light of the fiber laser by suitably adjusting the central wavelength of the tunable fiber Bragg grating.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
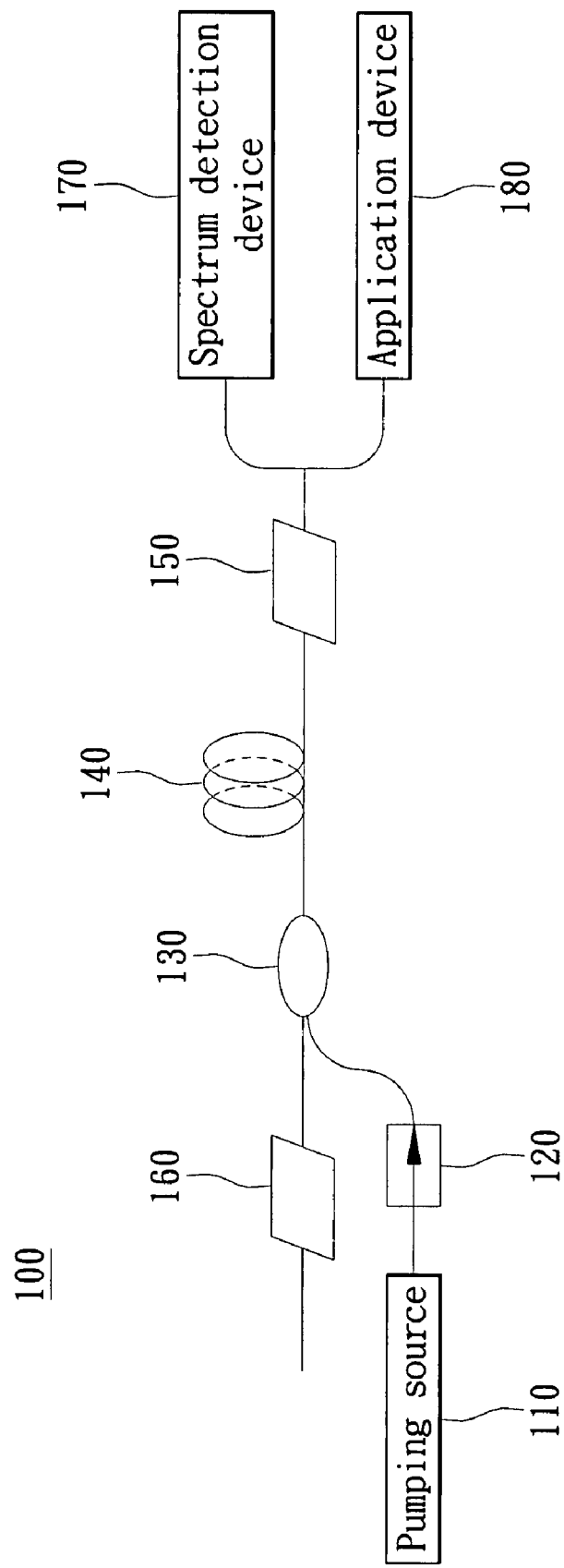
FIG. 1 is a structure diagram of the fiber laser of the previous invention.
Figure 2:
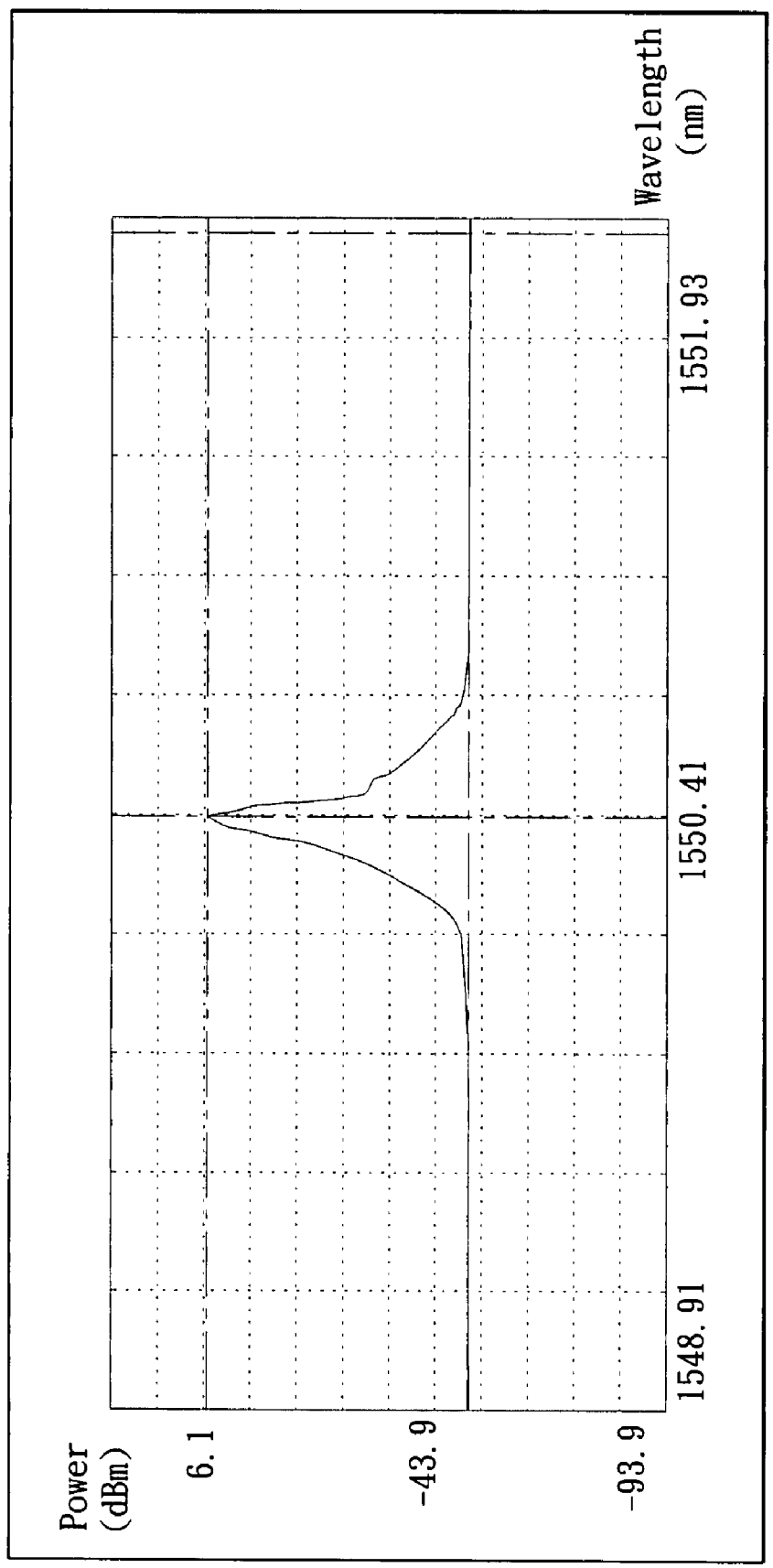
FIG. 2 is an output spectrum of the fiber laser of the previous invention.
Figure 3:
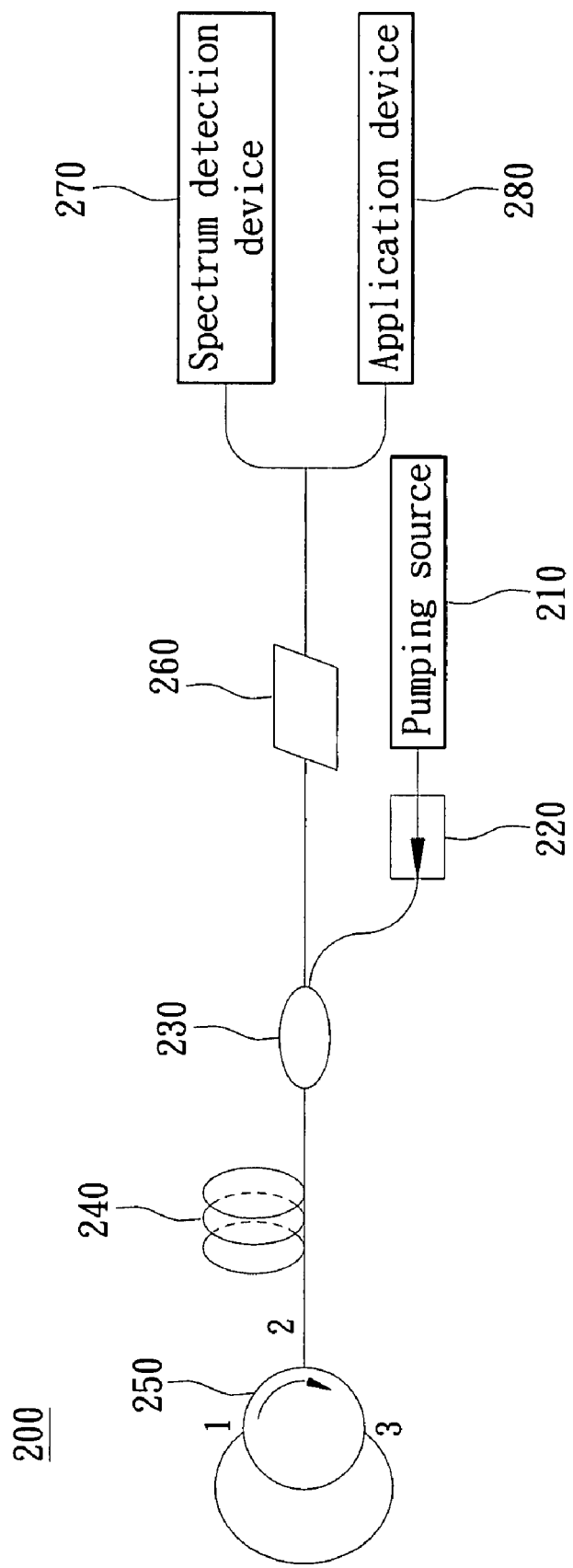
FIG. 3 is a structure diagram of the fiber laser of the previous invention.
Figure 4:
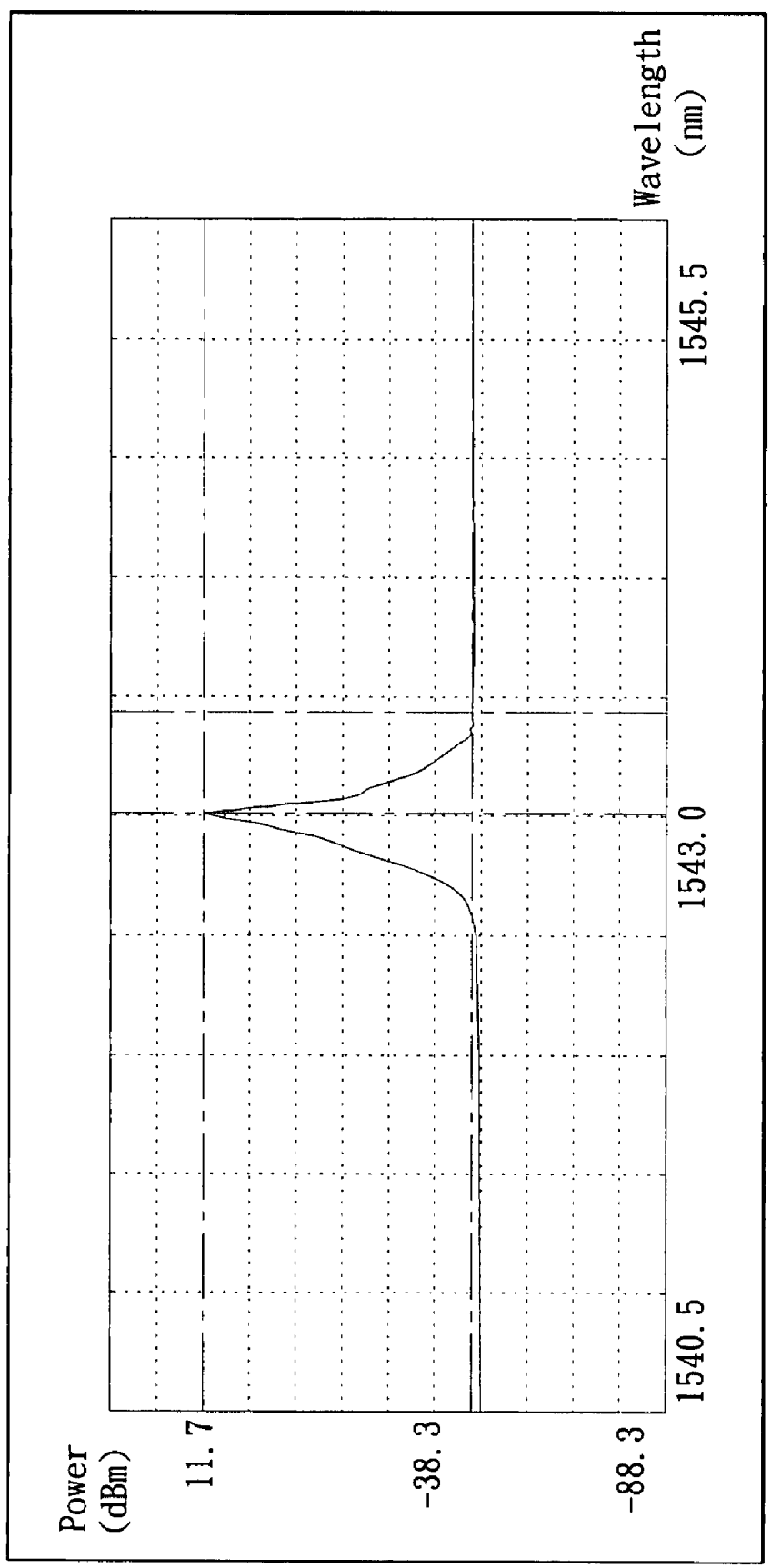
FIG. 4 is an output spectrum of the fiber laser for a previous invention.
Figure 5:
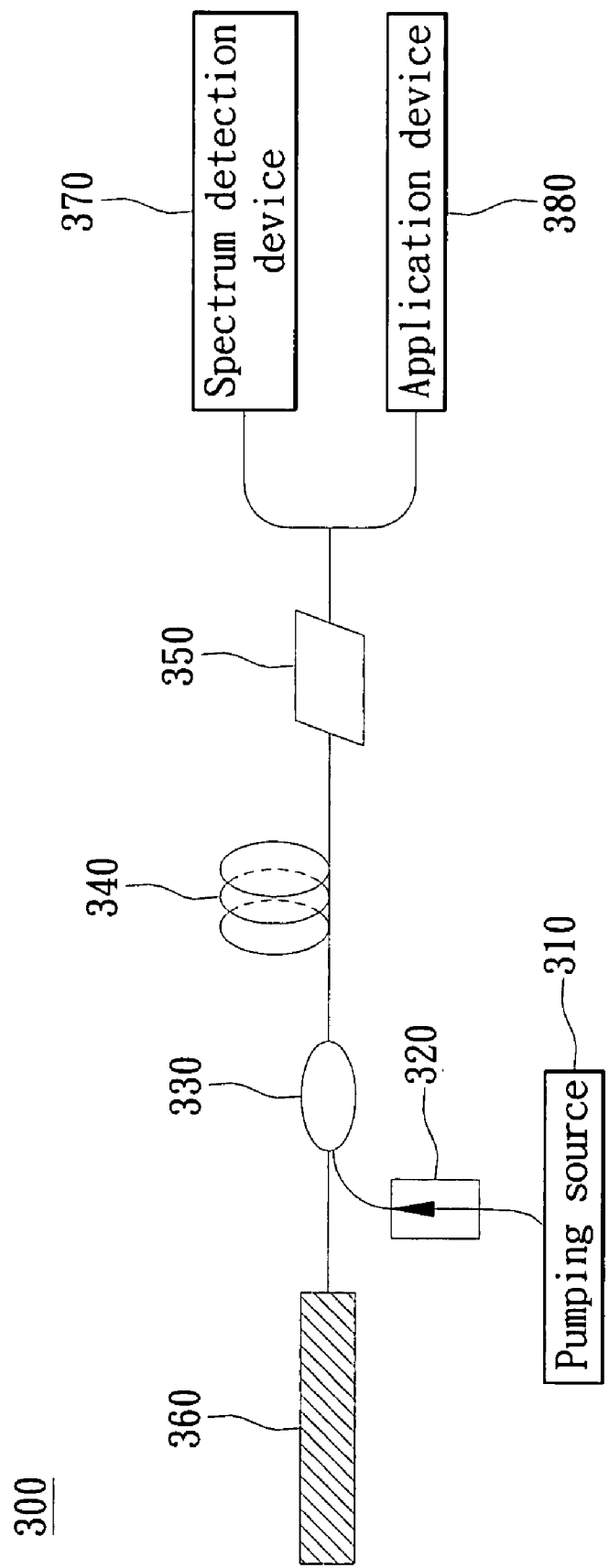
FIG. 5 is a structure diagram of the fiber laser of the first embodiment of the present invention.

The first embodiment of the present invention is shown in FIG. 5. The fiber laser 300 includes a pumping source 310, an optical isolator 320, a wavelength division multiplexing (WDM) coupler 330, an Erbium doped fiber 340, a fiber Bragg grating 350, a reflective mirror 360, a spectrum detection device 370, and an application device 380, wherein the spectrum detection device 370 and the application device 380 are auxiliary devices.

The pumping source 310 provides a light power and transmits the light power to a transmission path of the fiber laser 300 via the WDM coupler 330 for further pumping the Erbium doped fiber 340. The pumping source 310 can be a laser diode.

The Erbium doped fiber 340 is a gain fiber and is installed in the transmission path. Based on its characteristics, the pumped Erbium doped fiber 340 generates an energy transition and via the spontaneous emission or the stimulated emission emits a radiation light (light signal) having a broadband spectrum for further generating a laser light having greater coherence. However, the present invention can use other fibers that can amplify the light signal to be the gain fiber.

The fiber Bragg grating 350 is installed in the transmission path and has the most suitable reflectivity for lasing the maximum output power. When the light signal is projected onto the fiber Bragg grating 350, the portion of the light signal, which conforms to the central wavelength of the fiber Bragg grating, pass, but others are reflected. The fiber Bragg grating 350 can be a fiber Bragg grating. In one case of the present invention, the fiber Bragg grating 350 is an untunable fiber Bragg grating that includes only one central wavelength. Hence, the fiber laser 300 only emits a laser light with a narrow linewidth. If the fiber Bragg grating 350 is a tunable fiber Bragg grating, the fiber laser 300 can emit various laser light each time, wherein each laser light has its corresponding wavelength. In order to emit various laser lights, users can tune the central wavelength of the fiber Bragg grating 350 to different levels via different tuning means.

The reflective mirror 360 is installed in the transmission path and reflects the reflected light signal by the fiber Bragg grating 350. When the central wavelength is in the reflected range of the reflective mirror 360, the fiber Bragg grating 350 associates with the reflective mirror 360 to act as a resonance cavity. The light signal is transmitted and amplified between the fiber Bragg grating 350 and the reflective mirror 360 in the resonance cavity. Next, the light signal is outputted as a laser light from the fiber Bragg grating 350. Wherein, the output wavelength of the fiber laser 300 is identical to the reflecting wavelength of the fiber Bragg grating 350.

In the present invention, the reflective mirror 360 can be a fiber section plated with a reflecting material that scores 99 percent on the reflectivity, or other materials that score much lower on the reflectivity. Hence, there is a greater reflection at the interface between the plated material and the fiber. In order to avoid interfering and possibly breaking the pumping source 310, when the light signal reflects between the fiber Bragg grating 350 and the reflective mirror 360, the present invention provides an optical isolator 320 that is installed in which the pumping light is inputted.

For example, the power of the pumping source 310 is 100 mW, the length of the Erbium doped fiber 340 is 3 m, and the reflectivity of the fiber Bragg grating 350 is 50 percent.

Figure 6A:
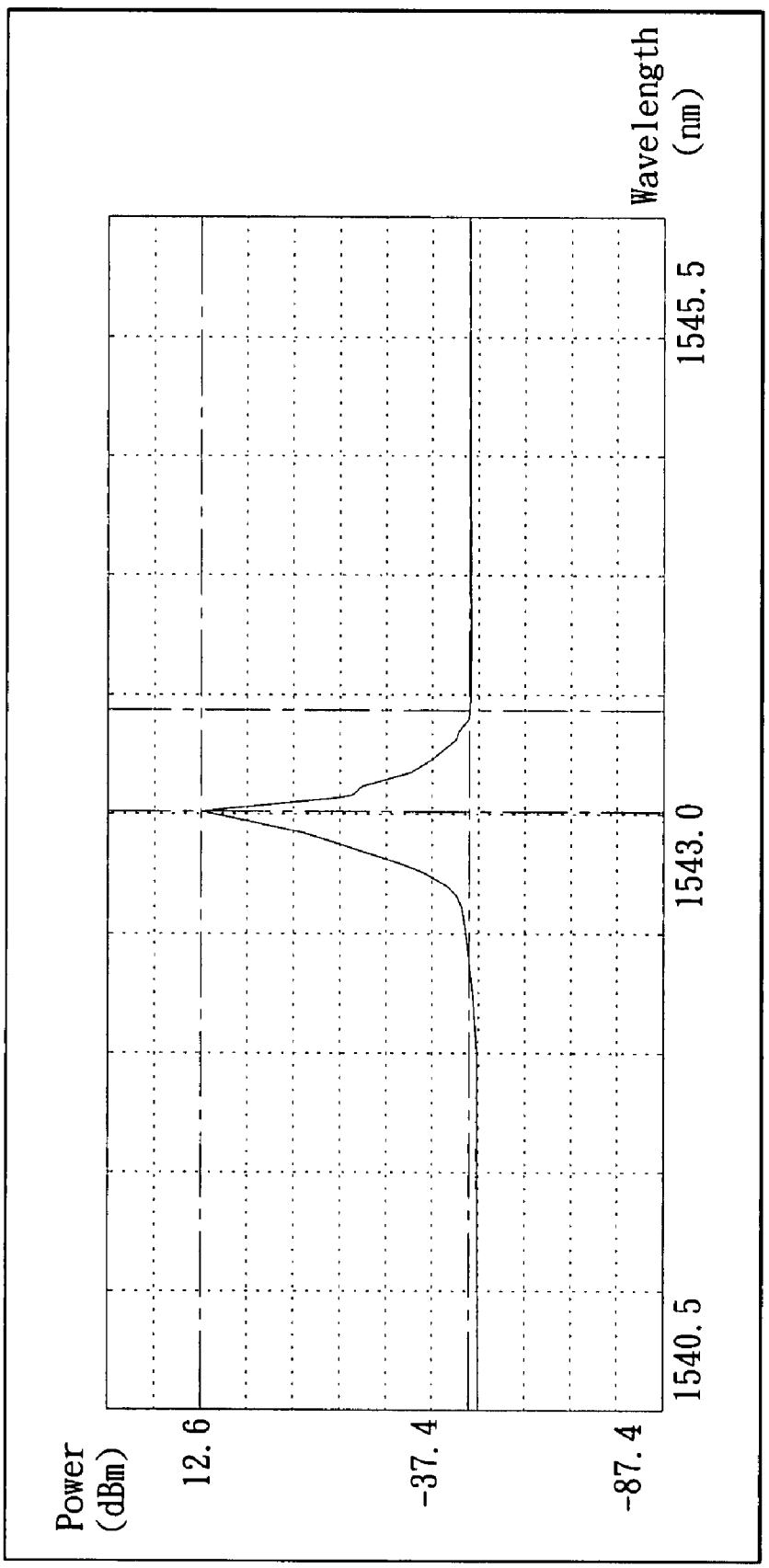
FIG. 6A is an output spectrum of the fiber laser of the first embodiment of the present invention including an untunable fiber Bragg grating.

In the case of the untunable fiber Bragg grating, the spectrum of the output of the fiber laser 300 in the first embodiment is detected by the spectrum detection device 370, as shown in FIG. 6A. In this case of the untunable fiber Bragg grating spectrum, the output wavelength of the fiber laser 300 is 1543 nm, the output power is 12.6 dBm, the side-mode suppression ratio (SMSR) is 57.8 dB, and the bandwidth in 3 dB is less than 0.05 nm that is the resolution limitation of the spectrum detection device 370.

Figure 6B:
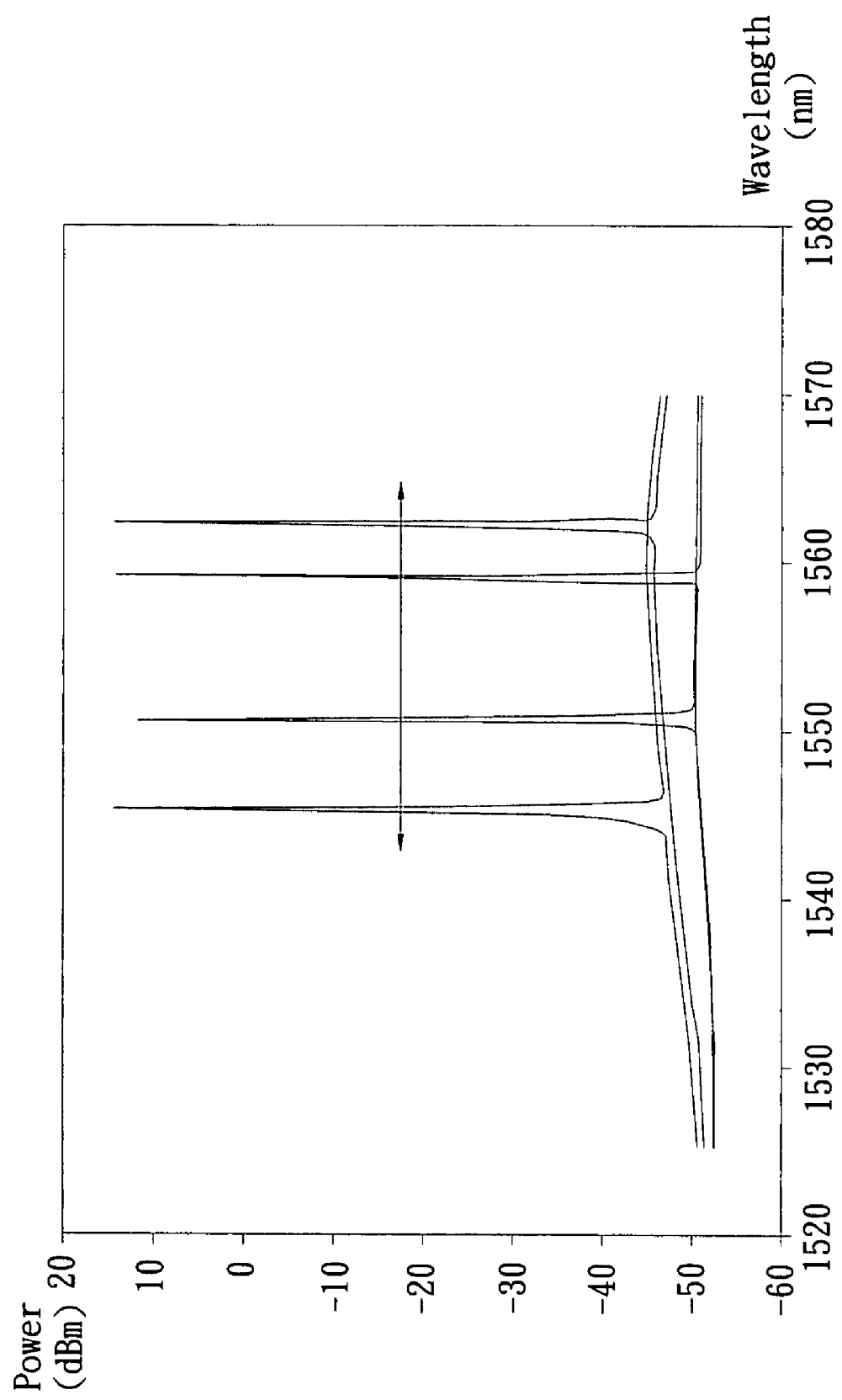
FIG. 6B is an output spectrum of the fiber laser of the first embodiment of the present invention including a tunable fiber Bragg grating.

In the case of the tunable fiber Bragg grating, the spectrum of the output of the fiber laser 300 in the first embodiment is detected by the spectrum detection device 370, as shown in FIG. 6B. If the tuning range of the tunable fiber Bragg grating is ±16 nm, the difference range of the output power of the fiber laser is ±1.6 dB.

Figure 7:
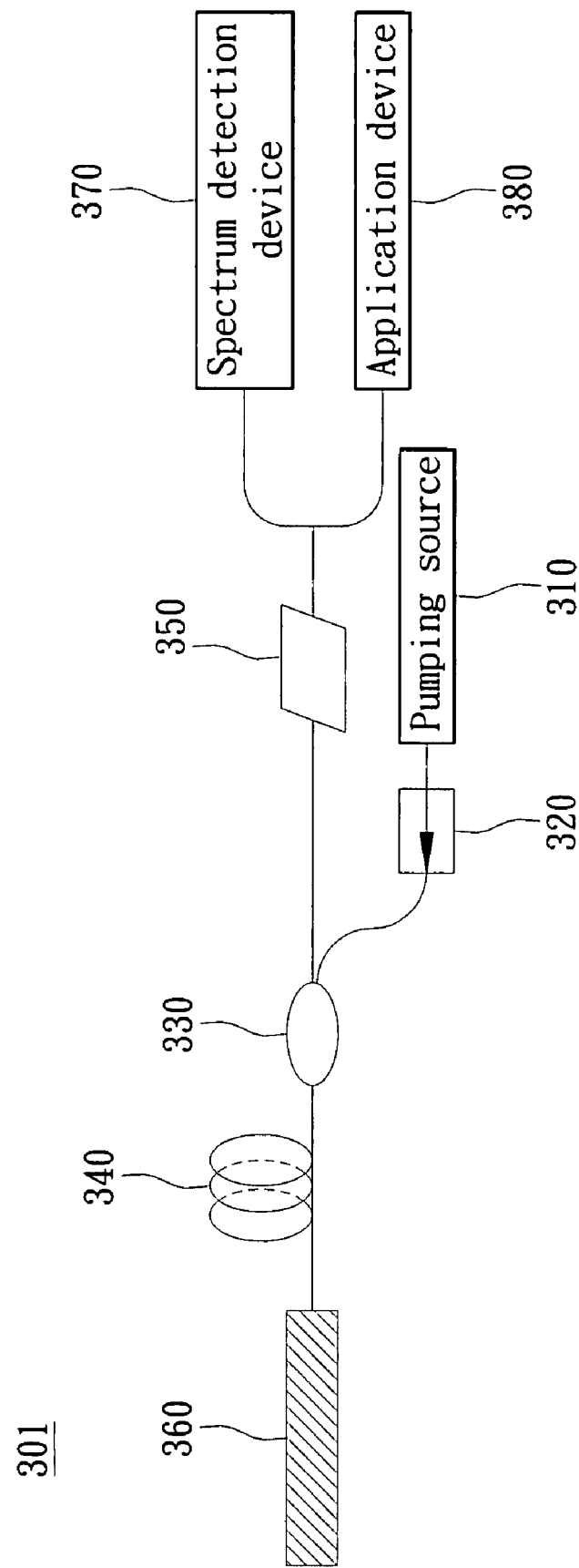
FIG. 7 is a structure diagram of the fiber laser of the second embodiment of the present invention.

The second embodiment of the fiber laser of the present invention is shown in FIG. 7. In the second embodiment, the fiber laser 301 includes a pumping source 310, an optical isolator 320, a WDM coupler 330, an Erbium doped fiber 340, a fiber Bragg grating 350, a reflective mirror 360, a spectrum detection device 370, and an application device 380.

The transmission direction of the light power provided by the pumping source 310 is different from the first embodiment. When the pumping source 310 pumps the light power into the transmission path via the WDM coupler 330, the light power pumps the Erbium doped fiber 340 to generate a light signal. The light signal is projected onto the reflective mirror 360 and is then reflected to the fiber Bragg grating 350. The narrow line-width wavelengths of the light signal satisfy the central wavelength of the fiber Bragg grating 350 and are reflected to the reflective mirror 360.

The light signal is reflected between the fiber Bragg grating 350 and the reflected mirror 360, and the pumping source 310 continuously create power to the transmission path. Moreover, the Erbium doped fiber 340 and the pumping source 310 amplify the light signal when the light signal is projected onto the Erbium doped fiber 340. Hence, the fiber laser 301 can produce laser light with high power.

In the second embodiment of the present invention, the fiber Bragg grating 350 can be an untunable or a tunable fiber Bragg grating.

Figure 8:
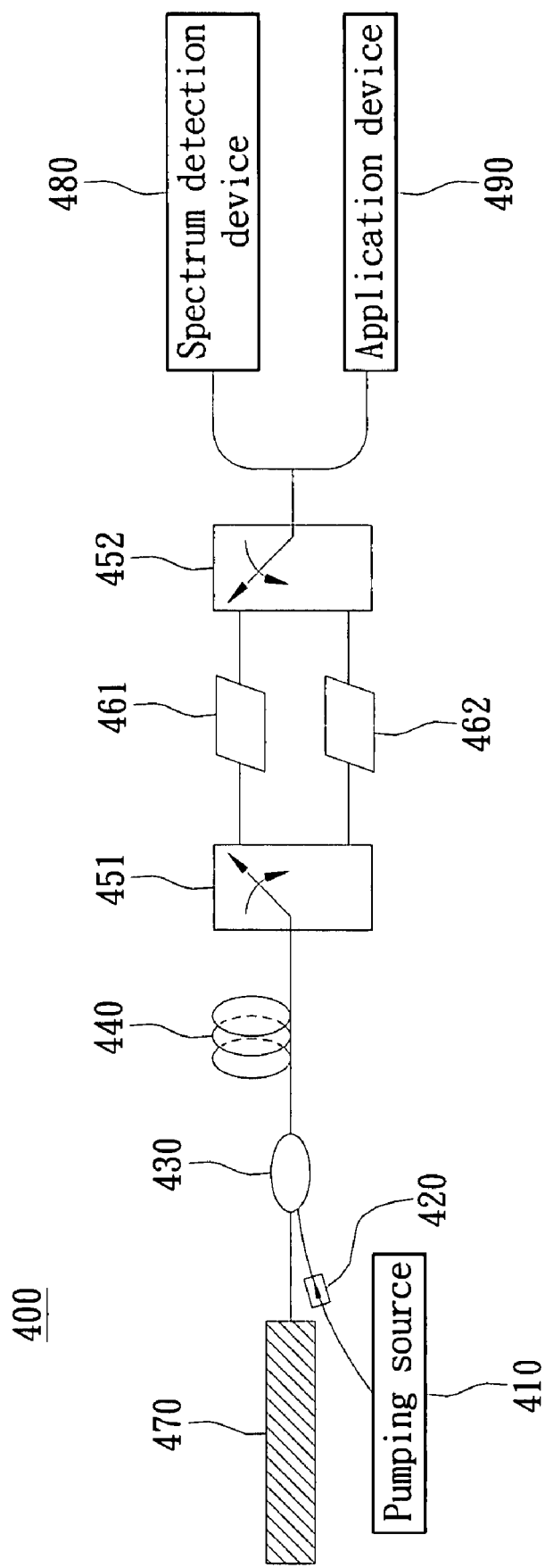
FIG. 8 is a structure diagram of the fiber laser of the third embodiment of the present invention.

The third embodiment of the fiber laser of the present invention is shown in FIG. 8. The fiber laser 400 includes a pumping source 410, an optical isolator 420, a WDM coupler 430, an Erbium doped fiber 440, two light switches 451 and 452, a plurality of fiber Bragg gratings, a reflective mirror 470, a spectrum detection device 480, and an application device 490. In this example, the fiber Bragg gratings are indicated the fiber Bragg grating 461 and the fiber Bragg grating 462 in FIG. 8.

Each of the light switches associates with each fiber Bragg grating that has a corresponding switching path. The fiber Bragg gratings 461 and 462 are respectively installed on the corresponding switching path. The present invention can select one of the switching paths to select the central wavelength of one of the fiber Bragg gratings. By switching the light switches synchronously, the light signal in the transmission path can transmit to one fiber Bragg grating on the corresponding switching path once.

In the third embodiment of the present invention, the fiber Bragg gratings can be untunable or tunable fiber Bragg gratings. If the fiber Bragg gratings are untunable, the fiber laser 400 can output a laser light with a narrow line-width that is associated with the selected untunable fiber Bragg grating. If the fiber Bragg gratings are tunable, the fiber laser 400 can output a laser light with a tunable narrow linewidth that is associated with the tunable selected fiber Bragg grating.

Figure 9:
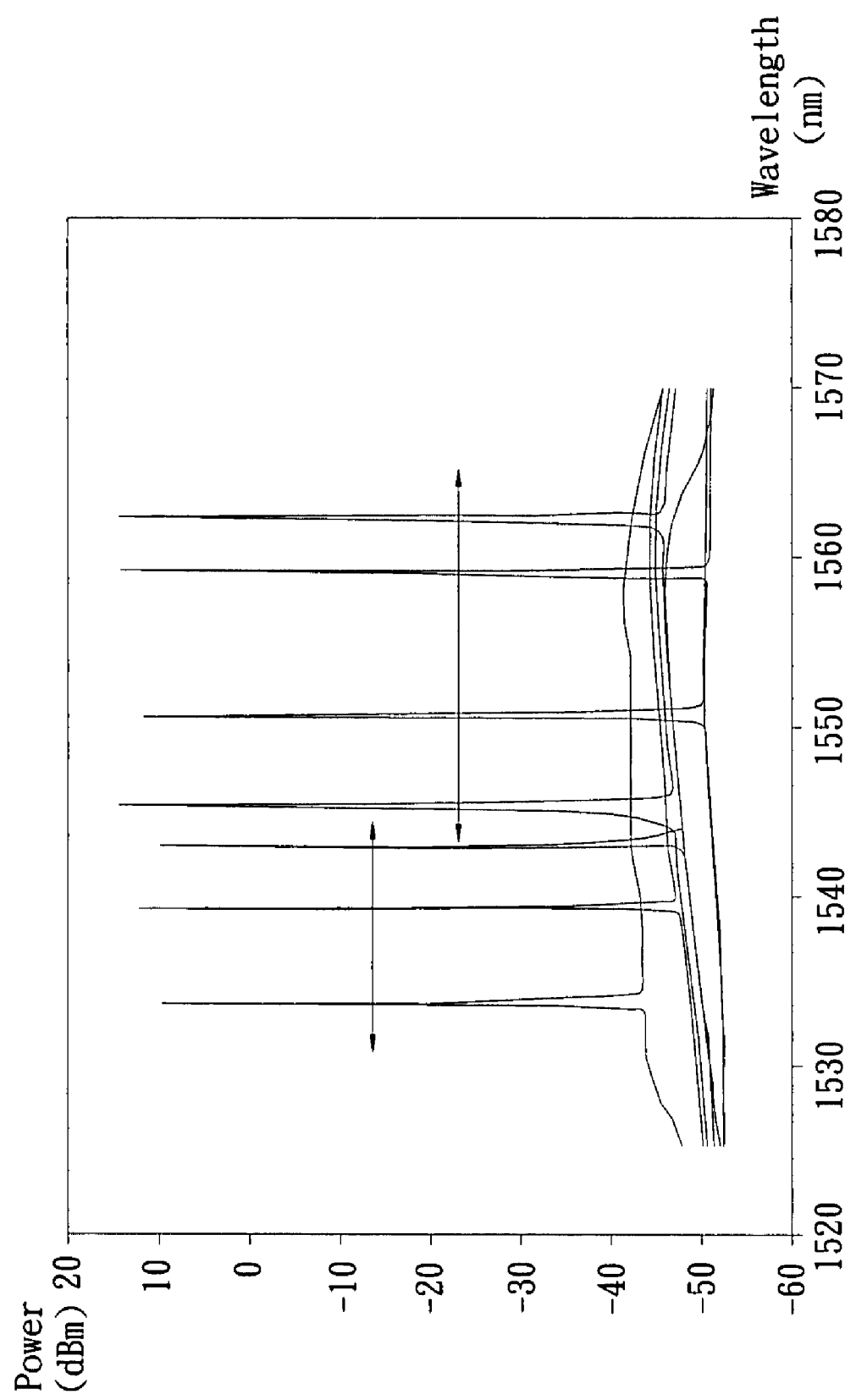
FIG. 9 is an overlapped output spectrum of the fiber laser of the third embodiment of the present invention.

In FIG. 9, the output spectrum of the fiber laser 400 including the tunable fiber Bragg gratings and the light switch pair is shown. In the spectrum of FIG. 9, the tunable range of the wavelength of the fiber laser 400 is greater than the other embodiments of the present invention, such as the fiber Bragg laser including no light switch and/or the untunable fiber Bragg grating. Moreover, the band of the fiber laser 400 is equal to the range of the central wavelength of the reflective mirror 470 if the fiber laser 400 has more tunable or untunable fiber Bragg gratings installed and the fiber laser 400 can stably output the broadband laser signal with a stable laser power.

All of the fiber lasers 300, 301, 400 are linear cavities, and each of the fiber lasers has a small size with short cavity length, and can emit a small linewidth laser light. Hence, any fiber laser in the present invention can output a laser light with good coherence.

The first advantage of the present invention is that the fiber laser provides a resonance cavity consisting of a reflective mirror and a fiber Bragg grating so that the light signal can resonate between the fiber Bragg grating and the reflective mirror.

The second advantage of the present invention is that the fiber laser includes an Erbium doped fiber that can amplify the light signal while the light signal is being transmitted in the resonance cavity.

The third advantage of the present invention is that the fiber laser includes a reflective mirror. Hence, the invention can ignore the shifting wavelength of the fiber Bragg grating, neither the consistency of the fiber Bragg gratings.

The fourth advantage of the present invention is that the fiber Bragg grating can be tuned to change the central wavelength so as to change the output wavelength of the fiber laser.

The fifth advantage of the present invention is that the fiber laser uses at least one light switch and a plurality of tunable fiber Bragg gratings to increase the wavelength band of its output.

The description above only illustrates specific embodiments and examples of the invention. The invention should therefore cover various modifications and variations made to the herein-described structure and operation of the invention, provided they fall within the scope of the invention as defined in the following appended claims.

What is claimed is:

1. A broadband fiber laser, comprising:

a pumping source providing a light power; and a linear resonance cavity comprising a transmission path having a gain fiber and a plurality of switching paths, a reflective mirror installed in the transmission path, and a plurality of fiber Bragg gratings installed in the transmission path and having a corresponding central wavelength, and the light power pumps the gain fiber to generate a light signal;

whereby, the light signal resonates between the reflective mirror and one of the fiber Bragg gratings in the linear resonance cavity, and the linear resonance cavity further outputs a laser light.

2. The broadband fiber laser according to claim 1, wherein the pumping source is a laser diode.

3. The broadband fiber laser according to claim 1, wherein the gain fiber is a fiber doped with a lasing activity material.

4. The broadband fiber laser according to claim 1, wherein the gain fiber is an Erbium doped fiber.

5. The broadband fiber laser according to claim 1, wherein the reflective mirror is a fiber section plated with a reflecting material.

6. The broadband fiber laser according to claim 1, wherein after the gain fiber is pumped, the light signal first is projected onto one of the fiber Bragg gratings for being further reflected back by the reflective mirror, and is then reflected by the selected fiber Bragg grating again.

7. The broadband fiber laser according to claim 6, wherein the light signal is projected onto the selected fiber Bragg grating according to the selection of one of the switching paths.

8. The broadband fiber laser according to claim 1, wherein the light power couples into the transmission path through a WDM coupler.

9. The broadband fiber laser according to claim 1, wherein the fiber Bragg gratings are untunable fiber Bragg gratings.

10. The broadband fiber laser according to claim 1, wherein the fiber Bragg gratings are tunable fiber Bragg gratings.

* * * * *